United States Patent [19]

von Benda

[11] Patent Number: 5,097,878
[45] Date of Patent: Mar. 24, 1992

[54] METHOD FOR VIBRATION-FILLING ELECTRODES HAVING WELDED-ON CURRENT DRAIN TAB IN A PASTE BATH

[75] Inventor: Klaus von Benda, Nürtingen, Fed. Rep. of Germany

[73] Assignee: Deutsch Automobilgesellschaft mbH, Fed. Rep. of Germany

[21] Appl. No.: 631,993

[22] Filed: Dec. 21, 1990

[30] Foreign Application Priority Data

Dec. 23, 1989 [DE] Fed. Rep. of Germany ....... 3942762

[51] Int. Cl.$^5$ ................. H01M 4/28; H01M 4/75; B06B 7/00
[52] U.S. Cl. ................................. 141/1.1; 141/32; 141/33; 141/2; 141/1; 141/623.1
[58] Field of Search ............. 141/1.1, 32, 33; 29/2; 29/623.1–623.5, 623.3

[56] References Cited

U.S. PATENT DOCUMENTS

| | | | |
|---|---|---|---|
| 4,051,876 | 10/1977 | Foulkes | 141/1.1 |
| 4,217,939 | 8/1980 | Yamagihara et al. | 141/1.1 |
| 4,508,147 | 4/1985 | Mosely et al. | 141/1.1 |
| 4,974,644 | 12/1990 | von Benda et al. | 141/1.1 |

FOREIGN PATENT DOCUMENTS

| | | |
|---|---|---|
| 3142091 | 5/1983 | Fed. Rep. of Germany . |
| 3632351 | 10/1987 | Fed. Rep. of Germany . |
| 3822197 | 8/1989 | Fed. Rep. of Germany . |
| 3822209 | 11/1989 | Fed. Rep. of Germany . |
| 0063773 | 5/1981 | Japan .................. 141/1.1 |

*Primary Examiner*—Ernest G. Cusick
*Attorney, Agent, or Firm*—Evenson, Wands, Edwards, Lenahan & McKeown

[57] ABSTRACT

A method with and associated apparatus for vibration-filling electrodes in a paste bath. A holding tool connected to a vertical rotary shaft carries the electrode and, arranged above it, a vibration reflection body. The electrode and vibration reflection body are immersed in the paste bath, filling of the electrode is carried out, and the holding tool, electrode and reflection body are withdrawn from the paste bath. Above the paste bath, the excess paste is spun off the electrode by rotating the vertical rotary shaft, the reflection body also being cleaned of the paste.

8 Claims, 6 Drawing Sheets

METHOD FOR VIBRATION-FILLING ELECTRODES HAVING WELDED-ON CURRENT DRAIN TAB IN A PASTE BATH

BACKGROUND AND SUMMARY OF THE INVENTION

The present invention relates to a method and apparatus for vibration-filling electrodes in a paste bath. The invention is preferably used for vibration-filling round electrodes having welded-on current drain tabs, but can also be used for electrodes having a prismatic or other shape.

Methods and appliances for vertically vibration-filling electrode substrates with an active compound paste are disclosed for example, in German Patent Specification 3,822,197, German Patent Specification 3,816,232, and German Patent Specification therein for round electrodes having a tab angled perpendicularly to the electrode plane is problematical, especially if the tab is welded on at the edge of a central hole, as in the case of the so-called pineapple-slice design for nickel/hydrogen cells.

The tab should be welded to the empty substrate before filling the latter but should not be obstructive during filling. In the arrangements disclosed in the above mentioned publications, normal rectangular electrodes having comparatively robust sheet metal tabs are welded onto a reinforced edge of the electrode substrate. (See for example, German Patent Specification 3,142,091 and German Patent Specification 3,632,251.) These tabs can be used to fix the electrodes in the filling appliance.

On the other hand, the electrodes for nickel/hydrogen cells carry long tabs of thin nickel sheet, which bend easily under the weight of the electrode. It is therefore usual to provide such round electrodes before filling with small auxiliary tab, onto which the long current drain tabs are welded after filling. This procedure entails some serious disadvantages, however. First, there is a double welding operation. (The auxiliary tab must be welded onto the electrode, and after filling, the current drain tab must then be welded to the auxiliary tab.) It is also necessary first to clean the tab; and the handling of the filled electrode is particularly difficult. In addition there are risks of dust being given off, and of mechanical damage to the electrode. In practice, therefore, it is customary to first wet the filled and dried electrode again before welding on the tab to the auxiliary tab in order to prevent dust of the carcinogenic nickel hydroxide being given off. When this is done, a second, additional electrode drying operation is necessary.

The object of the present invention is to provide a method and apparatus for vibration-filling fibrous or expanded structure substrates of electrodes having a welded-on current drain tab, wherein the substrates are filled rapidly and without great expense in a paste bath in a continuous working operation, and are capable of being easily cleaned of the excess of paste. Another object of the invention is to provide such a method and apparatus wherein a satisfactorily reproducible filling of the electrode substrates is achieved.

These and other objects are achieved by the method according to the invention, wherein the tab is bent so that it extends out of the paste bath approximately at right angles to the electrode surface, and the filling is carried out in the horizontal position of the electrode. For this purpose, the empty substrate is clamped in a support which has a vertical rotation shaft, and holding devices for the substrate which leave most of the substrate surface free. The electrode can be fixed at its periphery, for example, by claws; in the case of electrodes having a central hole or other formed openings, the holding devices can engage in the openings.

The tab is supported on the shaft of the holding tool. A tab made of nickel or of another ferromagnetic material is expediently held by a permanent magnet or electromagnet mounted on the shaft or forming a part of the shaft. To release the tab, the electromagnet can be switched off. Other holding means for the tab are clips, hooks, brackets or inflatable expanding bodies. Regardless of whether the holding means fix the tab securely or only loosely, they should act on the upper third of the tab length, so that a further step in the method according to the invention is possible, namely the cleaning of the filled electrode by spinning off the excess paste. For this purpose, the holding tool with the electrode substrate is withdrawn again from the paste bath after the filling operation and rotated by means of the vertical shaft.

Expediently, the method according the invention is performed by a computer-controlled automatic machine which brings the holding tool, and consequently the electrode, to a rotary speed sufficient to clean the electrode without loss of paste from the interior of the electrode. In this process, the tab support described above prevents bending of the tab under the influence of the centrifugal force during spinning.

Filled electrodes are, as a rule, heavier than catalyst electrodes which carry only a relatively thin catalyst layer. This applies particularly to fibrous and expanded structure electrodes, which can be of thicker construction than sintered foil electrodes, and are therefore capable of accepting particularly high capacities per unit area. Moreover, when the filled electrode is removed from the paste, its weight is at first still increased by the adhering excess paste which has to be spun off. Depending on the electrode size and the viscosity of the paste, therefore, an appreciable motor power is required for the spinning operation.

In order to manage with small, low power motors, such as stepping motors, the spinning-off is carried out with at least two rotary speeds. A lower rotary speed is selected such that at least 30% of the excess paste, or if possible still more, is removed. A higher rotary speed then serves to remove the more firmly adhering excess surface layer. Such preliminary cleaning by pre-spinning also has the advantage that if the rotary speed, paste pot diameter and paste viscosity are correctly matched, much of the excess paste flows back directly into the paste bath because the centrifugal force is not sufficient to spin the paste onto the pot wall. The exclusive return of a relatively viscous paste via the pot wall involves the risk of drying and crust formation on the pot wall. To reduce this risk, a cover whose opening just allows the insertion of the substrate may be placed on the paste post while the internal diameter of the pot is kept larger at the level of the spinning zone in order to make possible drainage of the excess paste during pre-spinning without wall contact.

The horizontal vibration-filling, i.e., the filling of an electrode substrate arranged with its surface horizontal and parallel to the paste pot base, is best accomplished with very small amounts of paste, and with the substrate immersed as shallowly as possible in the paste in order to minimize any contamination of the tab and holding tool. Owing to the small amount of paste, the entire paste pot can be mounted on a vibrator and vibrated. The paste pot should be constructed deep enough to provide room for spinning off the excess paste after impregnation of the substrate has been carried out. A constant paste level can be provided by a metering device which is so controlled by the automatic impregnating machine that the paste pot is again topped up with an appropriate amount of paste after every filling. The diameter of the paste pot in the actual paste bath section should exceed the electrode diameter as little as possible in order to minimize the amount of paste that is required. The diameter of the paste container in the region situated above the paste bath is normally greater than the diameter in the lower region in which the paste bath is present. The diameter may then decrease again towards the opening of the container. The shape of the container may therefore deviate more or less from the cylindrical shape and even assume spherical shape. For non-round electrodes, angular paste pots can also be considered.

The immersion and withdrawal of the electrode to be pasted should be sufficiently slow that deformations of the electrode surface are avoided; a higher speed is recommended outside the paste bath for the sake of saving time.

According to the invention, a substantial improvement of the filling of the electrode can be provided by installing above the electrode a rigid vibration reflecting body which is immersed in the paste bath during filling. In the simplest and preferred design, the reflecting body is in the form of an electrodeparallel plate, which reflects the vibrations originating from the pot base. This results in an intensified fluidization of the paste in the vibration field and consequently in more rapid and complete filling of the electrode substrate. The reflector may be a component of the electrode holding tool, or may be fixed to the latter. However, in principle it may also be a separate part of the apparatus, and be positioned by separate aids. Attachment of the reflector to the holding tool is preferred, because it achieves a simultaneous cleaning of electrode and reflector plate during spinning-off and avoids equipment expenditure for the purpose of reproducibly positioning the reflector.

The reflector should not only be rigid, but also light; and its surface should by hydrophobic. All these properties are offered by a plastic plate constructed of, for example, polystyrene. The shape of the plate should roughly correspond to that of the electrode. Thus, for example, in the case of round electrodes having a central hole as mentioned above, a similarly shaped reflector plate is beneficial. To feed through the above mentioned bent tab, the reflector has an opening, (or in the simplest case a slot), which extends to the edge of the plate.

It is obvious that the requirement for rigidity of the reflector need not be absolute, since even elastic bodies (for example, spring steel sheet) can reflect the shockwaves originating from the pot base, albeit with loss of energy. The method can therefore be implemented with reduced quality even with non-rigid reflectors. Thus, as used here, the description "rigid" means only that no substantial deformation of the reflector occurs during the vibration.

During vibration-filling, air escapes from the electrode substrate and rises in the paste bath. This air has to be removed as rapidly as possible, since it brings about an appreciable vibration damping. To deaerate the paste rapidly in the space between electrode substrate and reflector, the reflector may be provided with further openings in addition to the opening intended for feeding the tab through; for example it may be constructed as a perforated plate. This measure impairs, however, the reflection properties of the reflector under some circumstances. The design of the reflection body therefore must be matched in each case, therefore, to the particular system properties, which are determined by the vibration spectrum and the viscoelastic properties of the paste, and also by the geometry of the arrangement in the paste pot. The distance of the reflector from the electrode substrate is determined by the need to degas the paste rapidly and to clean the electrode and reflector by spinning-off. During spinning-off, the paste (which is no longer fluidized by vibration) must leave the gap between electrode and reflector satisfactorily and be capable of being spun onto the pot wall. In practice, a distance of 1 to 14 mm, and especially 4 to 12 mm, has proved advantageous.

It may sometimes be beneficial to provide the reflector with struts, ribs, pins or other surface structures which serve as electrode spacers and are able to make contact with the electrode at its surface. (Radially extending ribs are preferred for this purpose.) Where such reflectors make contact with the electrode by means of projections, care must be taken that as large a part of the electrode surface as possible remains untouched. Reflectors formed in this way can be concomitantly used to support the substrate or the electrode by forming a thrust block for clamping the electrode. Conversely, they may also utilize the electrode as thrust block for supporting, for example, a hinged reflector design.

To degas more rapidly and distribute the air bubbles better, it has been found advantageous to subject the electrode to an oscillation around the vertical axis during the impregnation. For this purpose, the rotary drive for the spinning-off is utilized. The drive should therefore make oscillatory movements possible; a stepping motor, for example, is suitable. The oscillation angle does not need to exceed 30° and the frequency should be above 5 Hz.

Although the filling of substrates is possible in a wide range of frequencies and amplitudes (40 to 125 Hz and 01. to 1.55 mm) for the paste container, for horizontal impregnation in accordance with the method according to the invention it is advisable not to exceed an amplitude of 0.2 mm, and to set the peak frequency at least 100 Hz to avoid splashes. Peak frequency is understood here to mean the highest frequency occurring during the vibration cycle.

The invention can also be utilized to fill normal rectangular electrodes having an outer edge tab, if the tab length is not prohibitively large. (This applies, in general, to electrodes of sealed cells, such as Ni/Cd cells having a prismatic housing.) Expensive cleaning of the tab is thus not necessary, since even if it is immersed in the paste, the tab is cleaned by the centrifugal force while the electrode is spun. Since the rectangular electrodes may be appreciably larger than the conventional round electrodes, it is advisable under some circumstances not to attach the reflection plate to the holding tool, but to locate it separately and to arrange it above the substrate after it has been inserted in the paste. For example, the reflection plate may be constructed as a hinged part which is swivelled upwards during insertion of the substrate into the paste bath and during its removal from the paste bath. This arrangement also has the advantage that the paste spun off is intercepted by the swung-up plate and is introduced into the paste bath during the next filling cycle. In the design as a hinged or folding part, the reflection plate may also be divided.

Other objects, advantages and novel features of the present invention will become apparent from the following detailed description of the invention when considered in conjunction with the accompanying drawings.

BRIEF DESCRIPTION OF THE DRAWINGS

FIGS. 3a and 3b illustrate a holding tool suitable for clamping the electrode substrates to be filled according to the invention; FIG. 3b being a cross-sectional side view of the device as shown in FIG. 3a;

DETAILED DESCRIPTION OF THE DRAWINGS

Figure 1:
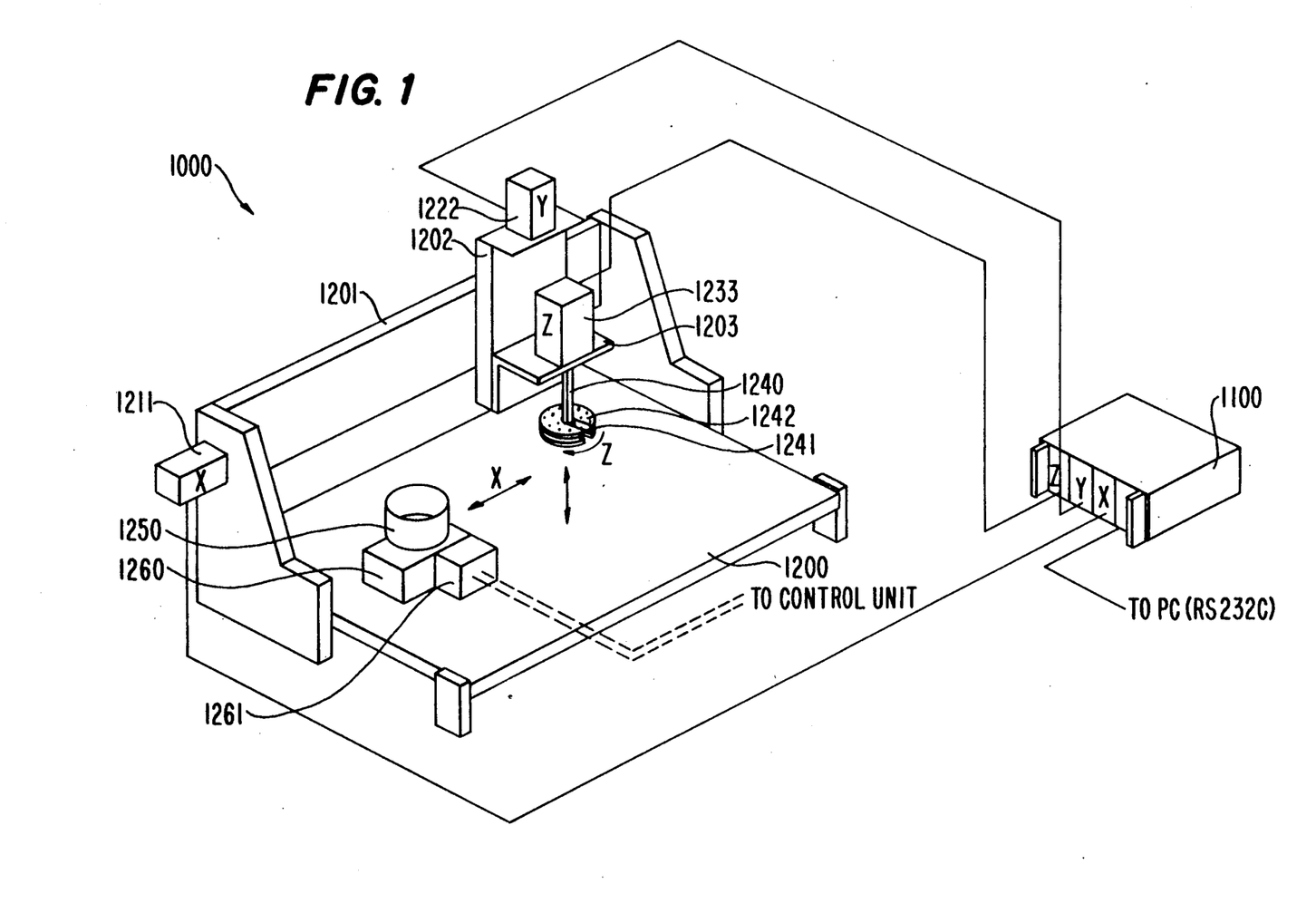
FIG. 1 is a perspective schematic view of a three-axes linear robot suitable for use in practicing the invention.

Referring now to FIG. 1, there is shown a three-axes linear robot 1000 with robot control unit 1100 and the working surface unit 1200, consisting of a linear unit 1201 and a stepping motor 1211 which moves slide 1202 in the (horizontal) X-direction. Slide 1202 itself is a linear unit moving a slide 1203 with a stepping motor 1233 in the (vertical) Y-direction driven by stepping motor 1222. Attached on the shaft of stepping motor 1233 is the holding tool 1240 with the electrode substrate 1241 and the reflector 1242, the rotation of which can be controlled by the (rotational) Z-control unit of the robot control unit 1100. In addition, FIG. 1 shows the paste container 1250 fixed on the horizontal vibration unit 1260 with stepping motor 1261, electrically connected (as indicated by the dotted lines) to a separate control unit (not shown). For simplicity, the paste feeder is also not shown.

Figure 2:
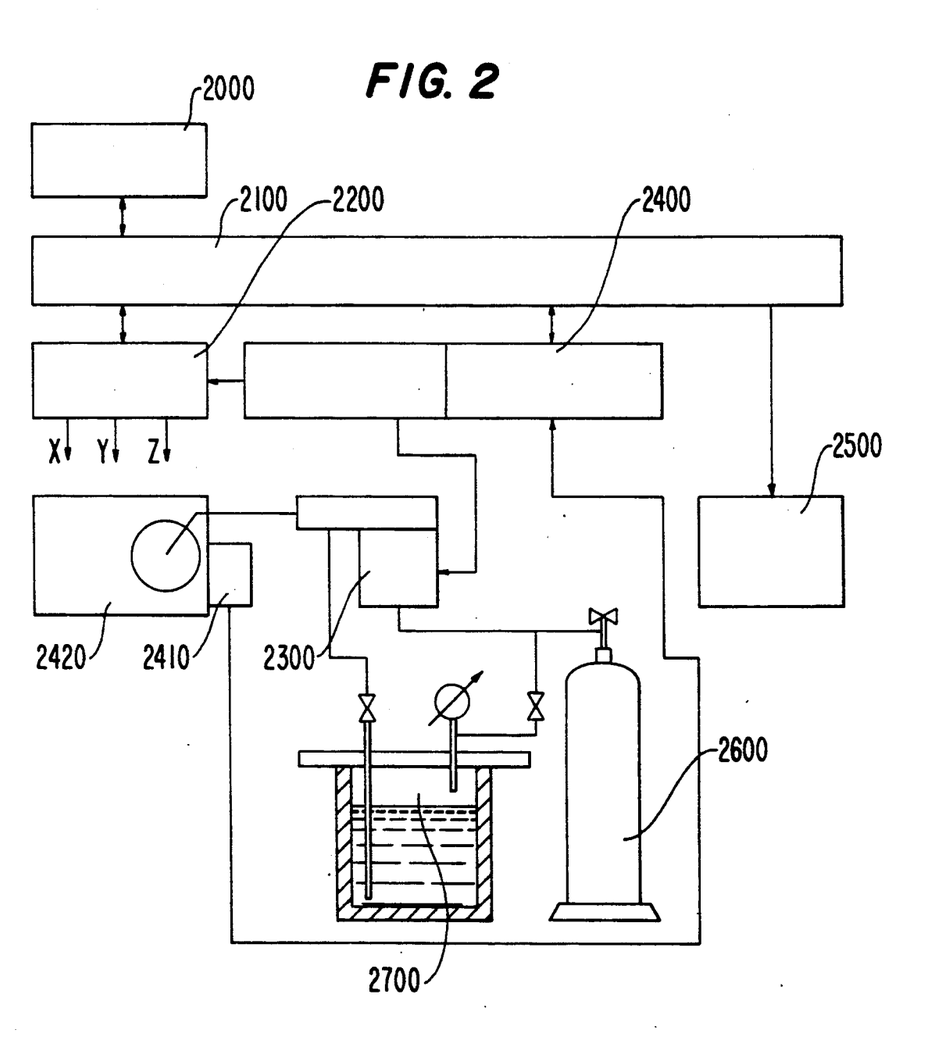
FIG. 2 is a schematic illustration of the control system for the horizontal vibration filling apparatus according to the invention.

FIG. 2 schematically illustrates the control system of the horizontal vibration filling apparatus. The personal computer 2000 is coupled via a peripheral access processor 2100 to the robot control unit 2200 as well as the stepping motor control unit 2400 for the stepping motor 2410 which drives the horizontal vibration unit 2420, the paste dosage vent 2300 and the balance 2500. Paste is fed by nitrogen gas pressure from cylinder 2600 which pressurizes the paste in pot 2700 to the paste feeder 2300.

Figure 3A:
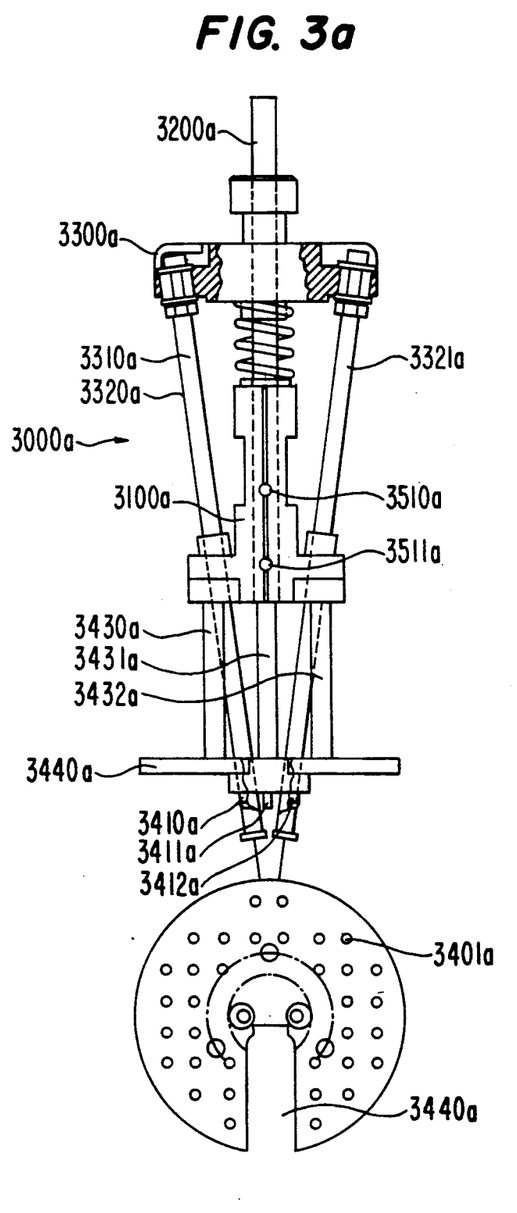
Figure 3B:
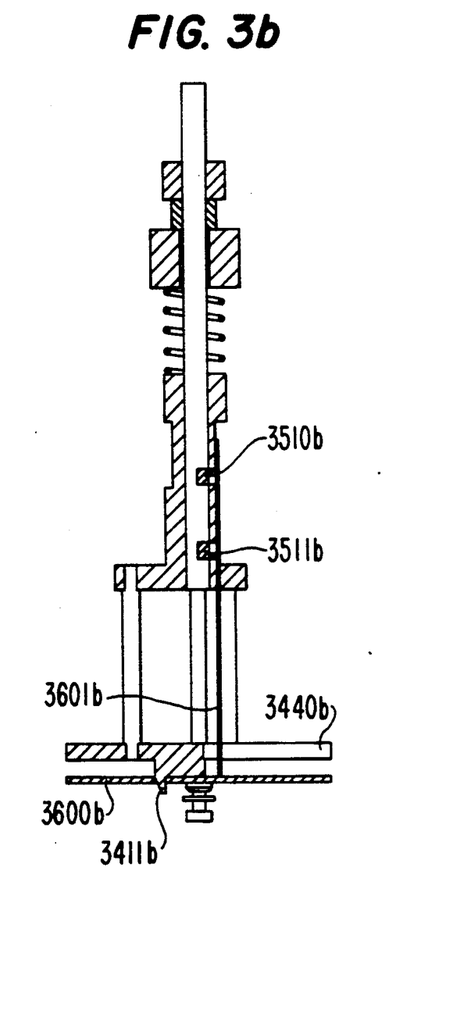
Figure 4A:
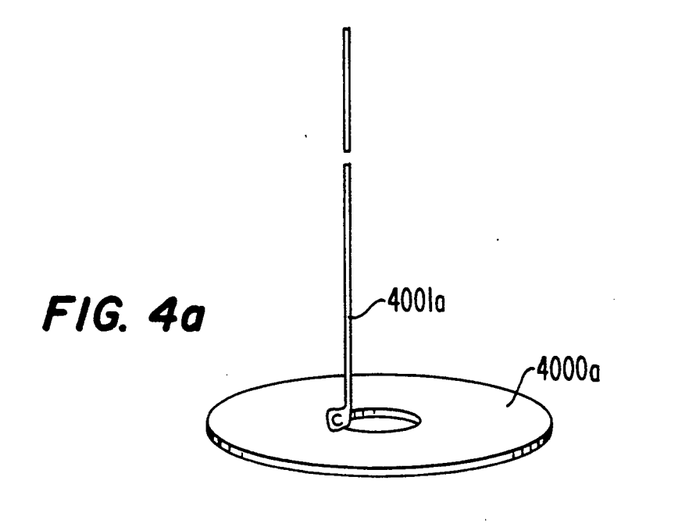
FIGS. 4a and 4b illustrate an electrode substrate to be filled according to the invention.

The holding tool for grasping the electrode substrates to be immersed in the paste bath is shown in FIG. 3. Referring to FIG. 3a, the holding tool 3000a has a body 3100a, axle 3200a and beam 3300a loaded by spring 3340a which presses the electrode substrate 3600b (FIG. 3b) by two pull rods 3320a and 3321a against supporting nodes 3410a, 3411a and 3412a extending from reflector plate 3400a which is fixed by bars 3430, 3431 and 3432 to the body 3100a of the holding tool. Two permanent magnets 3510a hold the tab 3601b (FIG. 3b) of the electrode substrate 3600b in position. The tab, which is best seen in FIG. 4a (reference numeral 4001a), is seen in side elevation in FIG. 3b, appearing as a line 3601b. Holes 3401a drilled in the reflector plate assist the degassing of the paste. Slot 3440a (FIG. 3a, also shown as 3440b in FIG. 3b) gives way to tab 3601b (FIG. 3b).

Figure 4B:
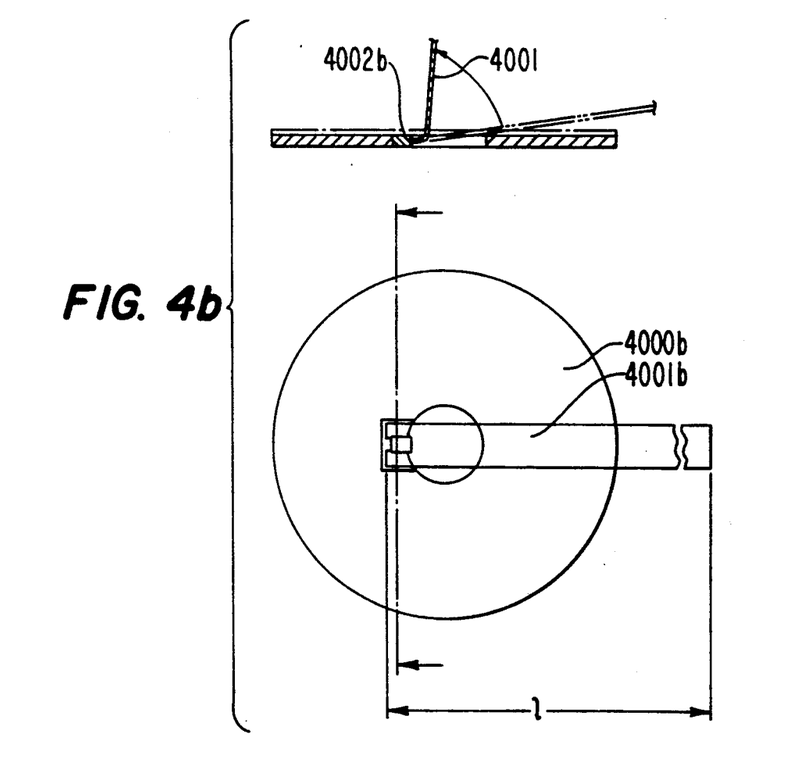

FIG. 4 illustrates the electrode substrate 4000a/b of length L, spot welded with its fingers 4002b to the substrate 4000a/b. As best seen in the top FIG. 4b, the tab is bent perpendicular to the substrate plane.

Figure 5A:
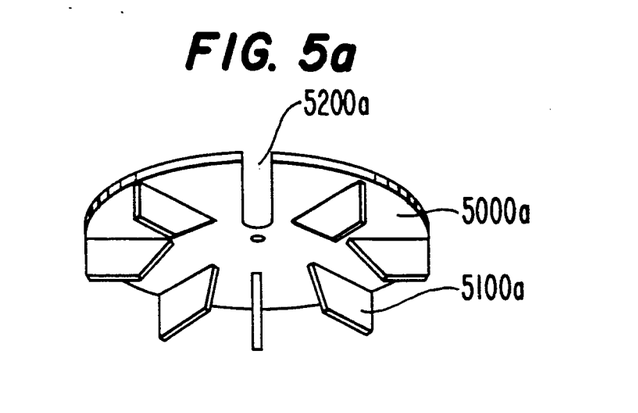
FIGS. 5a and 5b are perspective views of alternative shapes for the vibration reflector plate according to the invention.
Figure 5B:
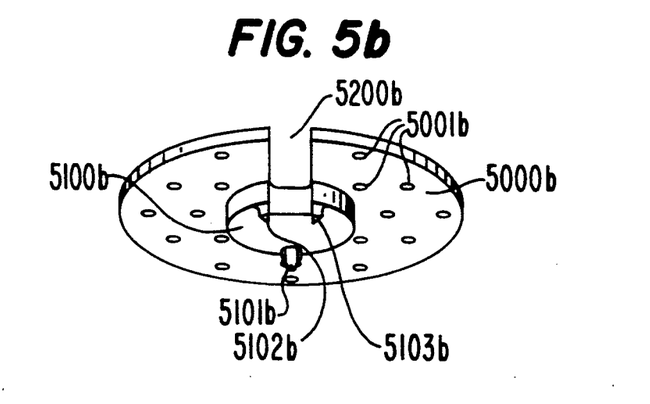

As illustrated in FIG. 5, the vibration reflector plates can take on various shapes dependent upon the size and orientation of the electrode substrate and the paste pot, as well as the manner of operation. In FIG. 5a, the vibration reflector plate 5000a, designed to be attached to the holding tool, has ribs 5100a serving as electrode spacers. Slot 5200a extends to the edges of the plate, leaving enough space for the tab.

Rigid reflector plate 5000b, shown in FIG. 5b, is made from polystyrene and has a diameter the same as or slightly greater than that of the substrate. Holes 5001b (approximately 3.4 mm in diameter) drilled into the plate assists degassing of the paste during vibration. The raised center area 5100b of reflector plate 5000b serves as an abutment, having three nodes 5101b, 5102b and 5103b, against which the electrode substrate is pressed. Slot 5200b again permits space for the electrode tab.

Figure 6A:
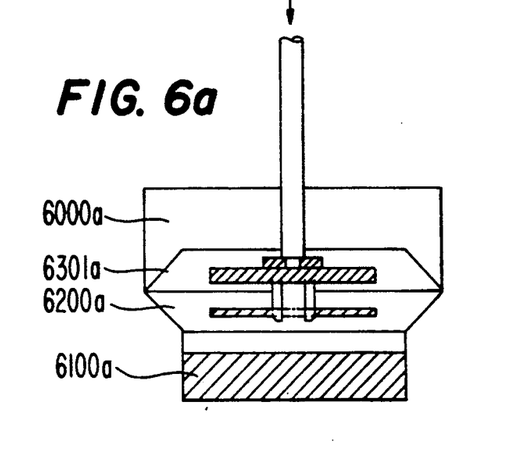
FIGS. 6a, 6b and 6c illustrates alternative shapes for the paste container within the scope of the invention.
Figure 6B:
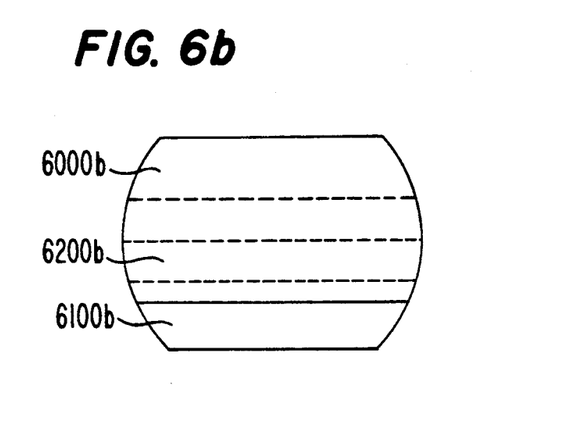
Figure 6C:
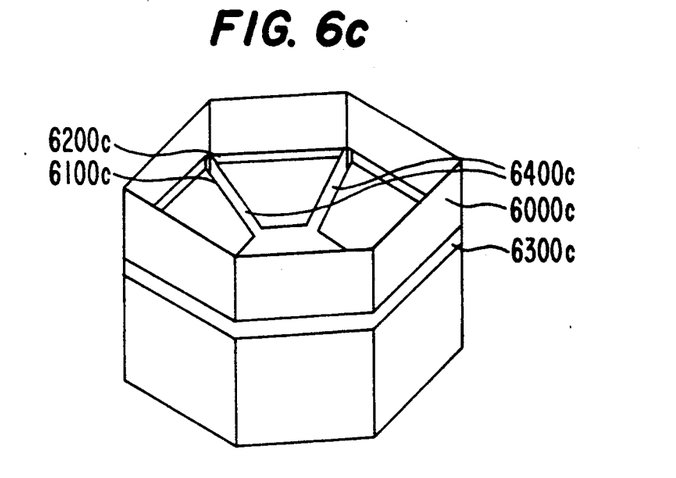

Within the scope of the invention, the paste container may also take on different sizes and shapes, as illustrated in FIG. 6. Referring to FIG. 6a, pot 6000a is cylindrical in shape, with its diameter being small in the impregnation zone 6100a and enlarged in the spinning zone 6200a. Shield 6300a serves to catch excess paste spun off from the substrates during rotation.

Referring to FIG. 6b, paste pot 6000b has a spherical shape, with paste impregnation zone 6100b and spinning zone 6200b. Finally, paste pot 6000c, as shown in FIG. 6c is a hexagonal prismatic container designed for a holding tool which does not itself carry a reflector plate. The reflector plate in this instance is arranged on the paste pot itself, and is partitioned in 6 wings 6100c, hinged to the container walls and activated by shape memory (NiTi) alloy springs 6200c heated by an electronic blanket 6300c. The slots 6400c between the wings assist with degassing the paste.

The invention will be described in yet further detail in the following examples.

EXAMPLE 1

An apparatus for filling positive round electrodes of 86 mm diameter having a central hole of 20 mm with nickel hydroxide paste comprises a three-axes linear robot (ISERT Electronic, D-6419 Eiterfeld Model 1299 with control unit 3380) having computer control, a platform having a computer-controlled vibrator and a paste pot mounted thereon, and also a computercontrolled metering device with paste stock. The cylindrical paste container is a plastic vessel of 0.75 liter capacity and an 8 cm height, and is filled with paste to a level of approximately 2 cm. The electrode holder is clamped by means of its rotary shaft in the z drive of the robot (for rotation) which can be moved up and down by a y drive; the x drive serves to translate the y- and z-axes above the paste pot. The electrode holder carries on its axis magnets for supporting the tab and also a spring-loaded gripping device with which it engages through the central hole of the electrode and fixes the electrode. At a distance of 7 mm above the electrode, the holder carries a polystyrene plate with a slot for inserting or removing the substrate or the electrode. The plate has the same dimensions as the electrode and has, in the center, three ribs which are directed towards the electrode and against which the electrode is pulled by the gripping device.

For the purpose of impregnation, the electrode substrate is picked up by the holding tool with the tab welded onto it so that the tab lies against the holding magnet and the tool moves together with the substrate over the paste pot. Then the holding tool together with the substrate is lowered rapidly to 3 cm above the paste and inserted into the paste slowly at 1/10 of the previous speed to such an extent that the reflector is covered by paste to a depth of 2 mm. The vibrator is then set in operation of 100 Hz and an amplitude of 0.13 mm. After 20 seconds, the vibration is stopped, and the holding tool with the electrode and the reflection body is removed from the paste bath until the filled electrode substrate is located approximately 3 cm above the surface of the paste. The z-axis of the linear robot is then caused to rotate at 1,000 rev/min. In a few seconds, the electrode and reflection body have been cleaned, and the excess paste spun off runs back from the container wall into the paste bath. Then the holding tool together with the electrode are completely lifted out of the pot and moved sideways, and the electrode is placed on a drying rack.

EXAMPLE 2

A rectangular electrode substrate (without central hole) is filled with cadmium oxide paste using an apparatus as specified in Example 1, the substrate carrying a short tab. The holding tool grasps the substrate plate at the edges. No reflection body is arranged on the holding tool. On the other hand, sheet metal segments, which can be swung through an angle of 90° and which cover the electrode at a distance of 6 mm as a reflection plate after it has been inserted in the paste bath, are located on the wall of the hexagonal paste container. In the covering formed, a free central hole is present for feeding through the shaft of the holding tool. After a filling time of 10 seconds, the vibration is shut off and the sheet metal segments are swivelled back against the wall of the paste container before the removal of the holding tool with the substrate from the paste bath so that, during the subsequent spinning operation, they catch the excess past spun off the substrate of in the direction of the container wall. The cleaning of the electrode is carried out in two stages, first at 300 and then at 1,000 rev/min. During this process, the short tab is substantially cleaned. In contrast to the electrode in Example 1, this short tab is provided at the outer edge of the electrode so that appreciable centrifugal forces act on it during the spinning operation.

The advantages of the method according to the invention and of the appliance are, in particular, that during vibrationfilling of fibrous structure substrates or expanded structure substrates of electrodes, having a current drain tab welded on, the substrates can be filled rapidly and without great expense in a paste bath in one continuous working operation and then easily cleaned of the excess of active compound paste. The method is carried out automatically in an apparatus so that very little manual operation is required. As a result, very high quantities can be processed cheaply, economically and in a manner that is environmentally safe. In addition, a very good, reproducible quality of the electrode substrate filling results.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Method for vibration-filling fibrous and expanded structure electrode substrates in a paste bath contained in a container, wherein the substrate has a welded-on current drain tap and is horizontally immersed in the paste bath, comprising the steps of:
   attaching the substrate to a holding tool connected to a vertical rotary shaft;
   attaching a vibration reflection body on said vertical rotary shaft at a predetermined distance above and parallel to the substrate;
   lowering the holding tool, with the attached substrate and vibration reflecting body, into the paste bath to such an extent that the substrate and vibration reflecting body are fully covered by the paste on all surfaces thereof;
   introducting vibrations into said paste bath, whereby said vibration filling of said substrate is carried out;
   withdrawing the holding tool, with the substrate and the vibration reflection body, from the paste bath to such an extent that all surfaces of said substrate are removed from said paste bath, but remaining within said container;
   rotating the vertical rotary shaft on which the holding tool is mounted, whereby excess paste is spun off the substrate and the vibration reflection body.

2. Method according to claim 1, wherein said vibration reflection body has dimensions which correspond approximately to dimensions of the electrode substrate, is arranged at a distance of 1 to 14 mm above the electrode substrate and is cleaned by spinning simultaneously with the electrode substrate.

3. Method according to claim 1, wherein the spinning-off of the excess paste from the electrode substrate is carried out at a first rotary speed and then at a second rotary speed of the vertical rotary shaft, said first speed being lower than said second speed.

4. Method according to claim 2, wherein the spinning-off of the excess paste from the electrode substrate is carried out at a first rotary speed and then at a second rotary speed of the vertical rotary shaft, said first speed being lower than said second speed.

5. Method according to claim 3, wherein at least 30% of the excess paste is spun off the electrode substrate at the first rotary speed of the vertical rotary shaft.

6. Method according to claim 4, wherein at least 30% of the excess paste is spun off the electrode substrate at the first rotary speed of the vertical rotary shaft.

7. Method according to claim 1, wherein the volume of past in the past container is kept constant by automatically topping-up.

8. Method according to claim 1, wherein paste container is filled to a maximum of 70% of a utilizable filling depth thereof.

* * * * *